United States Patent [19]
Weber

[11] 3,774,352
[45] Nov. 27, 1973

[54] ALIGNING DEVICE FOR WORKPIECES ON MACHINE TOOL TABLES

[75] Inventor: Ewald Weber, Coburg, Germany

[73] Assignee: Werkzeugmaschinenfabrik Adolf Waldrich Coburg, Hahnweg, Germany

[22] Filed: May 26, 1971

[21] Appl. No.: 147,076

[30] Foreign Application Priority Data
May 30, 1970 Germany.................. P 20 26 565.0

[52] U.S. Cl. .................................. 51/238, 254/104
[51] Int. Cl. ............................................ B24b 41/06
[58] Field of Search........................... 254/104, 106; 51/238

[56] References Cited
UNITED STATES PATENTS

| | | | |
|---|---|---|---|
| 3,278,158 | 10/1966 | Saldana............................. | 254/106 |
| 1,794,798 | 3/1931 | Sarr.................................... | 254/104 |
| 435,194 | 8/1890 | Teal.................................... | 254/104 |

FOREIGN PATENTS OR APPLICATIONS

| | | | |
|---|---|---|---|
| 356,284 | 9/1931 | Great Britain..................... | 254/104 |
| 266,581 | 3/1927 | Great Britain..................... | 254/104 |

Primary Examiner—Harold D. Whitehead
Attorney—Woodhams, Blanchard and Flynn

[57] ABSTRACT

An aligning device for workpieces on machine tool tables. The aligning device has a housing having a cover plate and a lifting ram vertically movably mounted on the cover plate and protruding out of the upper surface thereof. A pressure plate is arranged within the housing and engages the lower end of the lifting ram and has a planar wedge surface at its underside. A wedge is mounted in the housing below the lifting ram and is capable of sliding transversely of the lifting ram between the pressure plate and a base plate of the housing. The wedge has at its top surface a wedge surface which is parallel to the first-mentioned wedge surface and a planar under surface parallel to the interior surface of the base plate. Roller bearings or ball bearings are arranged between the wedge surfaces and between the underside of the wedge and the interior face of the base plate. A set screw is mounted in the lateral wall of the housing and engages the wire end of the wedge and is adapted to move same transversely of the lifting ram.

2 Claims, 1 Drawing Figure

Patented Nov. 27, 1973
3,774,352
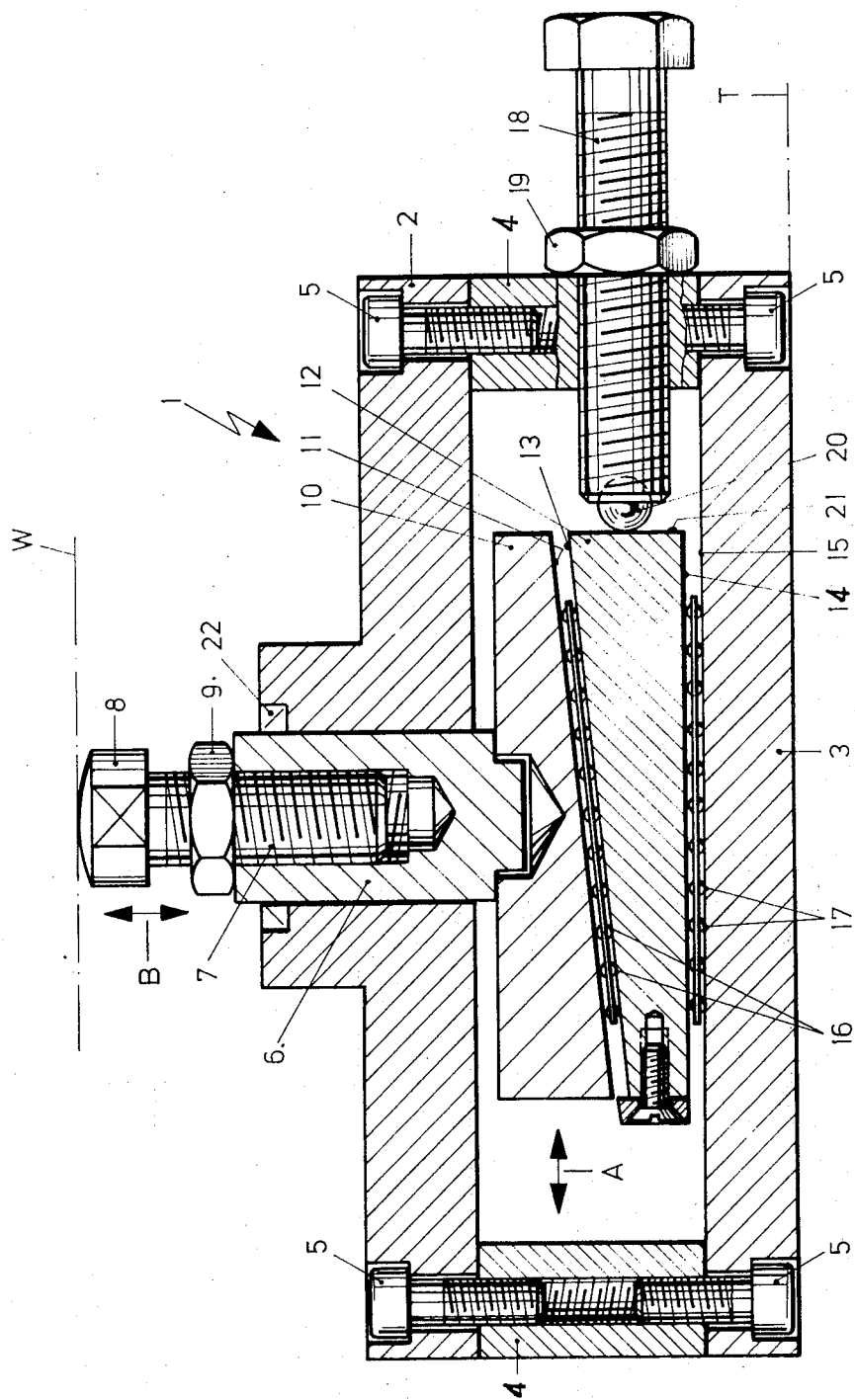
INVENTOR
EWALD WEBER
BY
Woodhams, Blanchard & Flynn
ATTORNEYS

ALIGNING DEVICE FOR WORKPIECES ON MACHINE TOOL TABLES

The invention relates to an aligning device for workpieces on machine tool tables.

Workpieces which are required to be machined on machine tools, more particularly those which are to be subjected to a super finishing treatment by grinding on guideway grinding machines or face grinding machines, have to be very accurately aligned with reference to certain reference surfaces or reference centres or other geometric values. Recently accuracies within tolerance limits of a few micro-metres have been demanded for such operations.

For less stringent accuracy requirements, aligning devices are known which consist substantially of small lifting units which are inserted between the machine table and the workpiece and, when actuated, cause a slight vertical displacement of the workpiece. The majority of the known aligning devices operate on the principle of screw and nut. They have the disadvantage that their components, more particularly the gear consisting of the screw and nut, is arranged largely without protection from the grinding coolant, grinding swarf and abraded material from the grinding wheel. Consequently the parts of the said known aligning devices are subject to heavy wear and also require frequent maintenance in order to remove grinding swarf, abraded grinding wheel material and possible insidient corrosion. It is a practical impossibility to use antifriction bodies to reduce the friction in the case of the known aligning devices. Because the known aligning devices have not been found successful for the high degree of precision demanded together with a simple and economical mode of operation, in many cases simple levers have been used to align workpieces with respect to machine tool tables, and then shins or bands of corresponding thickness — e.g., calibrated steel bands — have been arranged between the workpiece and the machine table.

The underlying aim of the invention is to produce an aligning device for workpieces on machine tool tables which is simple in its construction, relatively free from wear, requires very little maintenance and is easy to operate.

This is achieved according to the invention by the following features:

a. a housing closed on all sides, comprising a cover plate, lateral walls and a base plate,
b. a lifting ram mounted in the housing slidingly at right angles to the cover plate of the latter and protruding out of the cover plate,
c. a pressure plate arranged inside the housing at the lower end of the lifting ram, which has a planar wedge face on its underside,
d. a wedge slidable transversely to the lifting ram between the pressure plate and the base plate, which has on its top side a planar wedge face oriented parallel to the wedge face of the pressure plate, and on its bottom side a support face oriented parallel to the interior face of the base plate,
e. antifriction bodies which are arranged between the planar wedge faces and between the support face and the interior face,
f. a set screw mounted screwably in a lateral wall of the housing, which is braced against the wider end face of the wedge.

All the important transmission parts, more particularly the wedge and the antifriction balls or rollers are arranged inside the closed housing in the case of the new aligning device. They are consequently protected from grinding coolant, grinding swarf and abraded grinding wheel material. The new aligning device thus requires practically no maintenance and is comparatively free from wear. Due to the use of antifriction bodies between the planar wedge faces, the new aligning device can be operated sensitively and easily. The use of simple machine parts for the new aligning device has the advantage of simple and economic construction of the new aligning device.

Further advantages and features of the invention are explained in further detail hereinbelow with reference to an exemplary embodiment illustrated in the drawing, which shows the new aligning device in longitudinal section.

The housing 1 comprises a cover plate 2, a base plate 3 and the four lateral walls 4. These parts are attached firmly together by screws 5. A lifting ram 6 is mounted for vertical sliding in the cover plate 2. This lifting ram 6 is advantageously provided with a female screw thread 7 extending in its axial direction, in which a support screw 8 engages, the position of which can be secured by a check nut 9.

The workpiece W is supported upon the support screw 8.

At the lower end of the lifting ram, there is provided within the housing 1 a pressure plate 10 which has a planar wedge face 11 at its under side. Between the pressure plate 10 and the base plate 3, a wedge 12 is further provided which is slideable transversely to the lifting ram in the direction A. This wedge has on its top side a planar wedge face 13 which is oriented parallel to the planar wedge face 11 of the pressure plate 10. On its under side the wedge 12 has a support face 14 which is arranged parallel to the interior face 15 of the base plate 3. The base plate 3 is in turn supported upon the machine table T.

Between the planar wedge faces 11, 13 and the planar support face 14 and the planar interior face 15, a plurality of antifriction bodies 16, 17, are provided, and retained in cages in known manner. In one of the lateral walls 4 a set screw 18 is also screwably mounted, and its position can be secured by a check nut 19. The set screw 18 is advantageously braced against the wider end face 21 of the wedge 12 through the intermediary of a ball 20.

Advantageously, a seal 22 surrounding the lifting ram 6 is also provided in the cover plate 2, this prevents the penetration of coolant, grinding swarf and abraded grinding wheel material into the guide means of the lifting ram and the interior of the housing 1.

The operative principle of this new aligning device is as follows:

The aligning device is placed with its base plate 3 on the table T beneath the workpiece W. A course adjustment is first performed by rotating the support screw 8 with the lifting ram 6 partly retracted, as illustrated in the drawing. The support screw 8 is then secured by tightening the check nut 9. The set screw 18 is actuated in order to align the workpiece with respect to the table within tolerance limits of a few micrometres. Depending upon the direction of rotation of the set screw 18, the wedge is moved either to the left or to the right in direction A, while the lifting ram 6 executes a vertical movement in the direction B. When the workpiece has been precisely aligned in this manner, the check nut 19 is tightened.

I claim:

1. An aligning device for workpieces on machine tool tables, comprising:

a housing closed on all sides and having a cover plate, lateral walls and a baseplate supportable on a machine tool table and releaseable fastening means for separately attaching said cover plate and base plate to said lateral walls;

a lifting ram mounted in said cover plate for vertical sliding movement at right angles to said cover plate and protruding out of said cover plate at the top thereof, said lifting ram having a female screw thread extending in its axial direction and including a workpiece support screw threadedly engageable therein for providing a first, coarse alignment;

a seal surrounding said lifting ram in said top side of said cover plate to prevent entrance of material along said lifting ram into said housing;

a pressure plate separate from said lifting ram and enclosed within said housing, said pressure plate engaging and axially supporting the lower end of said lifting ram in recessed relation therewith, said pressure plate being substantially greater in length than the width of the lower end of said lifting ram and having a first planar wedge face at its under side;

a wedge enclosed within said housing and arranged to slide transversely of said lifting ram between said pressure plate and said base plate, said wedge having at its top side a second planar wedge face oriented parallel to said first wedge face and, at its under side, a planar support face oriented parallel to an interior face of said base plate, said pressure plate and wedge being of substantially similar length and said second planar wedge face extending generally co-extensive with said first planar wedge face;

antifriction bodies in cages arranged between said first and second wedge faces and between said support face and said interior face;

a set screw mounted screwably in a lateral wall of said housing and engaging the wider end face of said wedge and is adapted to move said wedge transversely of said lifting ram and pressure plate for providing a second, fine alignment;

check nuts mounted on said screws for locking the positions thereof.

2. A device according to claim 1 including a ball mounted between said set screw and said wider end face of said wedge.

* * * * *